United States Patent Office 3,042,554
Patented July 3, 1962

3,042,554
PROCESS AND COMPOSITION FOR RUST-PROOFING FERROUS STOCK
Melvin H. Swann, Havre de Grace, Md., assignor to the United States of America as represented by the Secretary of the Army
No Drawing. Filed Dec. 29, 1959, Ser. No. 862,727
2 Claims. (Cl. 148—6.15)
(Granted under Title 35, U.S. Code (1952), sec. 266)

The invention described herein may be manufactured and used by or for the Government for governmental purposes without payment to me of any royalty thereon.

The object of this invention is a method of treating encrusted ferrous surfaces with a compound designed to remove the rust, grease and oil from the surfaces and as a result of this chemical reaction, a protective coating is deposited and adheres to the treated surfaces.

Heretofore in treatments to remove incrustation and grease the surfaces were cleaned but left entirely unprotected from subsequent rust formation. Likewise compositions suitable for rustproofing ferrous surfaces were not suitable for simultaneous rust and grease removal.

Also compositions previously utilizing phosphoric acid for rust removal at ambient temperatures were comparatively slow in their action, while compositions for rustproofing ferrous surfaces were not effective in producing adequate protective deposits at normal temperatures for relatively short exposures.

This invention is primarily concerned with the development of concentrated compositions that are diluted with water, and will perform the operation desired in a single treatment at normal temperatures. This treatment is designed to remove rust, soap-type greases, and oil from ferrous surfaces, and leave on the clean surface an inorganic deposit for the purpose of preventing or retarding underfilm corrosion on exposure and of promoting adhesion of subsequent paint films.

The above objectives are attained by the synergistic effects of ethylene glycol monobutyl ether in combination with a water-soluble acid stable nonionic surface-active agent when used in an aqueous medium containing orthophosphoric acid and ferric oxalate. The synergistic effects of the combined glycol ether and surface-active agent are indicated by the sharp reduction in the rate of rust removal and weight of deposit formed when either component is omitted or reduced below minimum requirements of the formulations.

Compounds that meet the requirements of a water soluble, acid stable, nonionic surface-active agent are Triton X–100 (alkyl aryl polyether alcohols) Igepal CA–630 (nonyl phenoxy polyoxethylene ethanol), and Tergitol NPX (alkyl phenyl ether of polyethylene glycol). Equivalent concentrations of any of the agents will produce the synergistic effects necessary to attain the desired result.

To illustrate the invention, the following four compositions have been compounded, tested and found to possess optimum efficiency.

| | Ortho-phosphoric acid, ml. | Triton X–100, ml. | Ethylene Glycol Monobutyl Ether, ml. | Ferric Oxalate, ml. | Water |
|---|---|---|---|---|---|
| 1 | 354 | 15 | 120 | 150 | to make 1 liter. |
| 2 | 105 | 15 | 120 | 150 | Do. |
| 3 | 118 | 5 | 40 | 50 | Do. |
| 4 | 35 | 5 | 40 | 50 | Do. |

Example 3 and 4 are identical to 1 and 2 after dilution of the latter. Examples 1 and 3 are used when the excess can be washed off with water after two or more minutes' exposure; the excess from the use of Examples 2 and 4 may be wiped off with absorbent material after two or more minutes' exposure.

The effective range of component concentrations per liter of solution is as follows:

| Component | Diluted (for use) | Percentages |
|---|---|---|
| Ortho Phosphoric Acid (85%) | 26 to 170 ml | 2.6–17% by vol. |
| Water soluble, acid stable nonionic surface-active agent | 2.5 to 10 ml | .25–1% by vol. |
| Ethylene Glycol Monobutyl Ether | 20–62 ml | 2–6.5% by vol. |
| Ferric Oxalate | 20 grams to solubility limit. | 2% by weight to limit of solubility. |

Concentrated formulas containing more than 150 ml. of 85% orthophosphoric acid per liter, should be washed from ferrous surfaces after treatment; those containing less than 150 ml. of acid per liter may be wiped off with absorbent material.

The protective coating can be obtained from a minimum of 2% ferric oxalate in the diluted conditioner to a maximum that is limited only by the solubility of the salt in the conditioner. Throughout this range, the coating weight, composition, and rate of formation are constant; the only effect of varying the concentration of this is bath life when the same solution is used repeatedly. The ferric oxalate can be added as such or formed within the solution from other additives. For example the equivalent weights of ferric phosphate used with oxalic salts of sodium potassium, or ammonium, or with oxalic acid, will produce the same protective coating. Although substitution of any of these combinations for ferric oxalate prevents the preparation of concentrated formulas that can be diluted with water just prior to use and tends to form loose, powdery deposits on the surface of the iron oxalate deposit, such substitutions are considered to be within the scope of this invention.

The reduction of ferric ions in a strong phosphoric acid medium, from the influence of excess oxalate ions and the hydrogen released, causes accelerated formation of deposits of acid-insoluble ferrous oxalate on the exposed ferrous metal surfaces. The following reactions apparently take place (1) $3Fe + 2H_3PO_4 \rightarrow Fe_3(PO_4)_2 + 6H$
(2) $2H + Fe_2(C_2O_4)_3 \rightarrow 2FeC_2O_4 + H_2C_2O_4$ Some of the hydrogen released is visible at the beginning of the reaction and decreases as the deposit is built up; some yellow, insoluble ferrous oxalate also separates from the solution with repeated use. If ferrous ions are substituted for the excess ferric ions in the acid solutions, there is a pronounced reduction in the rate of rust removal and deposit formation and in coating weights, although light coatings of ferrous oxalate will form under prolonged exposure. Omission of either iron salts or oxalate ions will prevent the deposit formation.

This treatment can be carried on at temperatures from 10° C. to 60° C. but coating weight is affected by temperature. At 10° C. the time required for maximum coating weight is increased; 100 milligrams per square foot are deposited in two minutes, 200 milligrams in ten minutes and 225 milligrams in thirty minutes.

At 25° C., maximum coating weight of 300 milligrams per square foot is obtained in two minutes and prolonged exposure does not reduce the deposits. At 60° C. a maximum coating weight of 300 milligrams per square foot is obtained in one minute which drops to 250 milligrams in two or more minutes exposure.

The protective coating has proved to be an excellent primer coat where the treated surfaces are to be subsequently painted. Test panels, treated at 25° C. by dip application for 2 to 10 minutes and coated with O.D. enamel, specification MIL-E-10687, at a thickness of one mil, withstand 120 hours salt fog exposure when tested according to method 606.1 of Federal Specification TT-P-141b.

I claim:

1. A method of rust-proofing encrusted ferrous stock comprising, immersing said stock to simultaneously remove rust and grease and leave a protective coating thereon in a bath at 10° to 60° C. consisting of 2 to 6.5% by volume of ethylene glycol monobutyl ether in combination with .25 to 1.0% by volume of an acid stable nonionic surface active agent used in an aqueous medium containing 2.6 to 17% by volume of an 85% orthophosphoric acid and 2% by weight to the limit of solubility of ferric oxalate, utilizing the iron of the rust removed by the bath to produce an excess of ferric ions in the presence of an excess of oxalate ions to form a protective coating of ferrous oxalate on the stock, removing the stock from the bath, and washing the stock with water to obtain a coating insoluble in both water and acid.

2. A water soluble composition comprising an aqueous bath for simultaneously removing rust and grease ferrous stock and leaving a protective coating thereon of ferrous oxalate insoluble in water and acid, consisting of 2 to 6.5% by volume of ethylene glycol monobutyl ether with .25 to 1.0% by volume of an acid stable nonionic surface active agent in an aqueous medium containing 2.6 to 17% by volume of 85% orthophosphoric acid and 2% by weight to the limit of solubility of ferric oxalate, the bath depending for rust removal and ultimate coating on the excess ferric ions obtained from the removed rust.

References Cited in the file of this patent
UNITED STATES PATENTS

| | | |
|---|---|---|
| 1,895,569 | Curtin et al. | Jan. 31, 1933 |
| 2,396,776 | Douty et al. | Mar. 19, 1946 |
| 2,516,685 | Douty et al. | July 25, 1950 |
| 2,712,511 | Orozco et al. | July 5, 1955 |
| 2,832,706 | Toubes | Apr. 29, 1958 |
| 2,886,477 | Smith | May 12, 1959 |